(12) United States Patent
Tanaka

(10) Patent No.: US 11,826,942 B2
(45) Date of Patent: Nov. 28, 2023

(54) DIE FOR EXTRUSION MOLDING, PLASTIC MANUFACTURING DEVICE, AND PLASTIC MANUFACTURING METHOD

(71) Applicant: Takashi Tanaka, Kanagawa (JP)

(72) Inventor: Takashi Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/692,129

(22) Filed: Mar. 10, 2022

(65) Prior Publication Data

US 2022/0297367 A1    Sep. 22, 2022

(30) Foreign Application Priority Data

Mar. 16, 2021  (JP) .................................. 2021-042874

(51) Int. Cl.
*B29C 48/31*    (2019.01)
*B29C 48/255*   (2019.01)
*B29C 48/25*    (2019.01)

(52) U.S. Cl.
CPC .......... *B29C 48/313* (2019.02); *B29C 48/255* (2019.02); *B29C 48/2566* (2019.02)

(58) Field of Classification Search
CPC .. B29C 48/255; B29C 48/2566; B29C 44/424
See application file for complete search history.

(56) References Cited

U.S. PATENT DOCUMENTS

| 2,902,716 | A | 9/1959 | Roberto |
| 6,383,425 | B1 | 5/2002 | Wu et al. |
| 6,521,675 | B1 | 2/2003 | Wu et al. |
| 2001/0018121 | A1* | 8/2001 | Okamoto ............. B29C 44/348 428/315.7 |

(Continued)

FOREIGN PATENT DOCUMENTS

| EP | 0838322 A2 | 4/1998 |
| JP | 4043975 | 11/2007 |

(Continued)

OTHER PUBLICATIONS

European Search Report; Application 22161615.4; dated Aug. 12, 2022.

*Primary Examiner* — Kelly M Gambetta
*Assistant Examiner* — Virak Nguon
(74) *Attorney, Agent, or Firm* — Duft & Bornsen, PC

(57) ABSTRACT

A die for extrusion molding includes an extrusion port configured to extrude a plastic composition, and a plastic flow channel configured to cause the supplied plastic composition to flow to the extrusion port. The plastic flow channel includes a supply flow channel, and an extrusion flow channel. The supply flow channel is configured to be supplied with the plastic composition. The extrusion flow channel has an upstream end coupled to the supply flow channel, and downstream end having the extrusion port. In the extrusion flow channel, a flow channel cross-sectional area perpendicular to the flow direction of the plastic composition in the extrusion flow channel gradually changes to the extrusion port, and an inner wall surface of a flow channel has a protruding surface protruding toward an inside of the flow channel in a cross section including an extrusion central axis and parallel to the extrusion central axis.

14 Claims, 3 Drawing Sheets

(56) References Cited

U.S. PATENT DOCUMENTS

| | | |
|---|---|---|
| 2002/0035164 A1 | 3/2002 | Wu et al. |
| 2002/0105106 A1 | 8/2002 | Wu et al. |
| 2002/0135088 A1 | 9/2002 | Harfmann |
| 2003/0138515 A1* | 7/2003 | Harfmann ............ B29C 44/348 425/467 |

FOREIGN PATENT DOCUMENTS

| | | |
|---|---|---|
| WO | 0014150 A1 | 3/2000 |
| WO | 02059188 A2 | 8/2002 |

* cited by examiner

DIE FOR EXTRUSION MOLDING, PLASTIC MANUFACTURING DEVICE, AND PLASTIC MANUFACTURING METHOD

CROSS-REFERENCE TO RELATED APPLICATIONS

The present application claims priority under 35 U.S.C. § 119 to Japanese Patent Application No. 2021-042874, filed on Mar. 16, 2021. The contents of which are incorporated herein by reference in their entirety.

BACKGROUND OF THE INVENTION

1. Field of the Invention

The present invention relates to a die for extrusion molding, a plastic manufacturing device, and a plastic manufacturing method.

2. Description of the Related Art

Conventionally, such a die for extrusion molding is known that has an extrusion port through which a plastic composition containing a plastic of at least one type is extruded and a plastic flow channel through which the supplied plastic composition flows to the extrusion port.

Conventionally, such a die for extrusion molding is known that has an extrusion port through which a plastic composition containing a plastic of at least one type is extruded and an extrusion flow channel through which the supplied plastic composition is extruded to the extrusion port.

Japanese Patent No. 4043975 describes one that extrudes, in the die for extrusion molding described above, a plastic composition from the extrusion port having an annular shape to extrusion-mold a foamed plastic having a cylindrical shape. When the plastic composition is extruded from the die for extrusion molding, the plastic composition is allowed to be foamed, molding a foamed plastic.

However, there has been such a risk of the occurrence of corrugated wrinkles on a foamed plastic.

SUMMARY OF THE INVENTION

According to an aspect of the present invention, a die for extrusion molding includes an extrusion port, and a plastic flow channel. The extrusion port is configured to extrude a plastic composition containing at least one type of plastic. The plastic flow channel is configured to cause the supplied plastic composition to flow to the extrusion port. The plastic flow channel includes a supply flow channel, and an extrusion flow channel. The supply flow channel is configured to be supplied with the plastic composition. The extrusion flow channel has an upstream end in a flow direction of the plastic composition and a downstream end in the flow direction. The upstream end being coupled to the supply flow channel. The downstream end having the extrusion port. In the extrusion flow channel, a flow channel cross-sectional area perpendicular to the flow direction of the plastic composition in the extrusion flow channel gradually changes to the extrusion port, and an inner wall surface of a flow channel has a protruding surface protruding toward an inside of the flow channel in a cross section including an extrusion central axis and parallel to the extrusion central axis.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
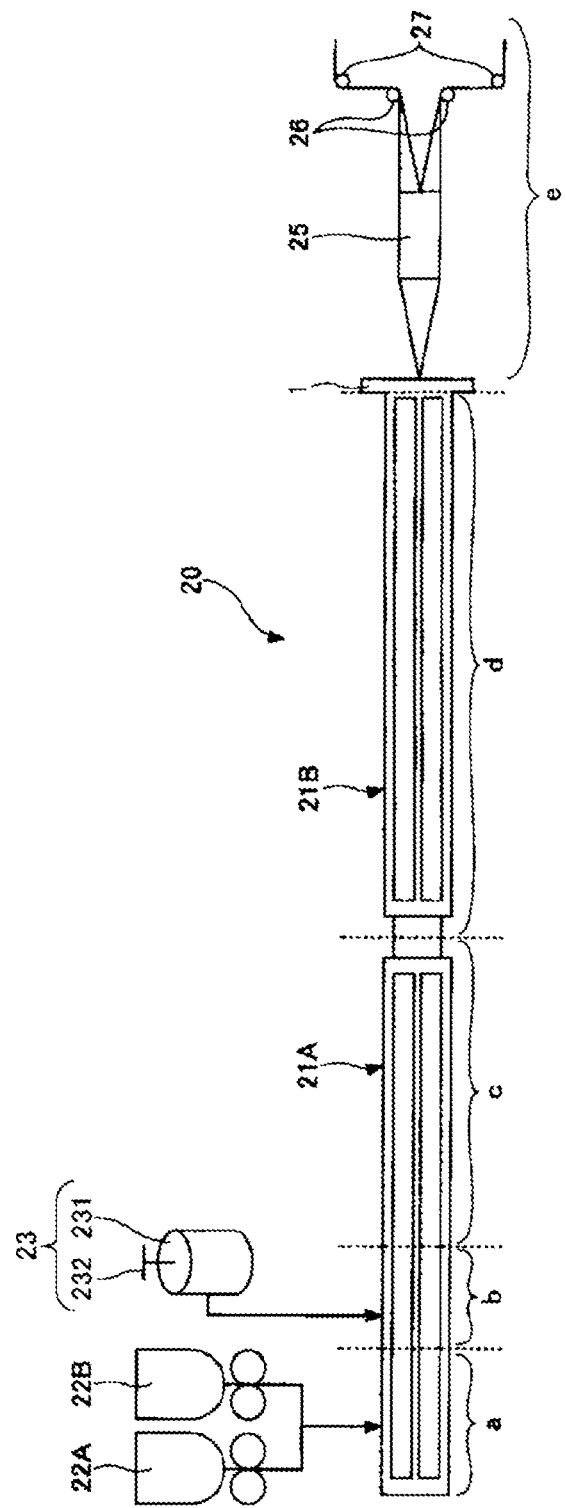
FIG. 1 is a schematic configuration diagram of a foamed plastic manufacturing device according to a present embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

A method for manufacturing a foamed plastic sheet representing a foamed plastic will now first be described herein.
Method for Manufacturing Foamed Plastic Sheet The method for manufacturing a foamed plastic sheet, according to the present invention, includes a kneading process and a foaming process, and further includes other processes if necessary.

The kneading process and the foaming process may be performed simultaneously or may be performed as separate processes.

Kneading Process

The kneading process represents a process for kneading a plastic and, if necessary, a filler. In the kneading process, a foaming agent may be added to more efficiently promote foaming. Depending on the application of a molded product, such materials may be kneaded as cross-linking agents, antioxidants, colorants, absorbing agents for various light beams, antistatic agents, and electrical conductive materials. In order to more efficiently promote foaming, or in order to more efficiently perform kneading, the kneading process may be performed under the presence of a compressible fluid.

Note that a plastic, a filler, and a mixture that is produced in intermediate processes in the course of obtaining a final molded product may sometimes be referred to as a plastic composition or a masterbatch.

Plastic

It is possible to use, as the plastic described above, for example: styrene homopolymers such as polystyrene and poly-p-methylstyrene; styrene copolymers such as styrene-maleic anhydride copolymers, styrene-acrylonitrile copolymers, styrene-butadiene copolymers, styrene-acrylonitrile-butadiene copolymers, styrene-acrylic acid copolymers, and styrene-methacrylic acid copolymers; styrene-based resins such as mixtures of polystyrene and polyphenylene oxide; and aliphatic polyester resins such as polylactic acid, polyglycolic acid, poly(3-hydroxybutyrate), poly(3-hydroxybutyrate/3-hydroxyhexanoate), poly(3-hydroxybutyrate/3-hydroxyvalerate), polycaprolactone, polybutylene succinate, and poly(butylene succinate, adipate)).

Among those described above, it is preferable to use biodegradable resins that are to be biodegraded by microorganisms and aliphatic polyester resins representing high polymer materials having an environmentally friendly, low environmental load property. In particular, it is more preferable to use polylactic acid representing a material having a carbon neutral, relatively inexpensive property. When polylactic acid is contained at a mass percentage of 90 or more, it is possible to obtain a foamed plastic having a biodegradable property.

Filler

Such a filler as described above (which will be hereinafter sometimes referred to as a "foamed nucleating material") is contained for the purpose of adjusting a foaming state (including size, amount, and arrangement of bubbles) of a foamed sheet, for the purpose of cost reduction, and for the purpose of improving its strength.

Examples of the filler described above include inorganic fillers and organic fillers. One of them may be solely used. Two or more of them may be used together.

Examples of the inorganic fillers described above include talc, kaolin, calcium carbonate, layered silicate, zinc carbonate, wollastonite, silica, alumina, magnesium oxide, calcium silicate, sodium aluminate, calcium aluminate, sodium aluminosilicate, magnesium silicate, glass balloons, carbon black, zinc oxide, antimony trioxide, zeolite, hydrotalcite, metal fibers, metal whiskers, ceramic whiskers, potassium titanate, boron nitride, graphite, glass fibers, and carbon fibers.

Examples of the organic fillers described above include naturally occurring polymers such as starch, cellulose particles, wood flour, soybean curd refuse, rice husk, bran, and their modified products, as well as sorbitol compounds, benzoic acid and metal salts of its compounds, metal salts of phosphate ester, and rosin compounds.

Among those described above, it is preferable to use silica representing an inorganic nucleating agent because of its high affinity with compressible fluids described later. Furthermore, it is preferable to use, when a filler other than silica is used as a base, such a filler that has undergone a surface treatment with silica.

Foaming Agent

Examples of the foaming agent described above include, in terms of easily obtaining a foamed plastic sheet at a high expansion ratio, hydrocarbons including lower alkanes such as propane, normal butane, isobutane, normal pentane, isopentane, and hexane; ethers such as dimethyl ether; halogenated hydrocarbons such as methyl chloride and ethyl chloride; and physical foaming agents including compressible gases such as carbon dioxide and nitrogen.

Among those described above, it is preferable to use compressible gases such as carbon dioxide and nitrogen, from a viewpoint of no odor, safe handling, and low environmental load.

Compressible Fluid

Example substances that are possible to be used as the compressible fluids described above include carbon monoxide, carbon dioxide, dinitrogen monoxide, nitrogen, methane, ethane, propane, 2,3-dimethylbutane, ethylene, and dimethyl ether. Among those described above, it is preferable to use carbon dioxide because it has a critical pressure of approximately 7.4 MPa and a critical temperature of approximately 31° C., it makes it possible to easily create a supercritical state, and it is nonflammable and easy to handle. One of these compressible fluids described above may be solely used. Two or more of them may be used together.

Since the solubility of a compressible fluid changes depending on the combination of a plastic and the compressible fluid, temperature, and pressure, it is necessary to appropriately adjust an amount of the compressible fluid to be supplied.

For example, for a combination of polylactic acid and carbon dioxide, its preferable amount ranges from 2 mass % or more to 30 mass % or less. When carbon dioxide is supplied at an amount of 2 mass % or more, it is possible to prevent such an issue from occurring that the effects of plasticization are limited. When carbon dioxide is supplied at an amount of 30 mass % or less, it is possible to prevent such an issue from occurring that, due to the phase separation of carbon dioxide and polylactic acid, it is impossible to obtain a foamed sheet having a uniform thickness.

Kneader

For a kneader used in the kneading process, it is possible to adopt a continual process in which the kneading process and the foaming process are continuously performed. It is otherwise possible to adopt a batch process.

However, it is preferable to appropriately select a reactive process by taking into consideration those factors including device efficiency, product characteristics, and quality.

Examples of the kneader include, in terms of that they are able to deal with viscosity that is preferable for kneading, single-screw extruders, multi-screw extruders, kneaders, unscrewed cage type stirring tanks, BIVOLAK products manufactured by Sumitomo Heavy Industries, Ltd., N-SCR products manufactured by Mitsubishi Heavy Industries, Ltd., and tube-type polymerization tanks equipped with an eyeglass-blade- or grid-blade- (manufactured by Hitachi, Ltd.), or Kenix-type- or Sulzer-type-SMLX type static mixer. Other examples include, in terms of color tone, finishers representing self-cleaning polymerization devices, N-SCR products, and twin-screw extruders. Among those described above, it is preferable to use finishers and N-SCR products, in terms of the color tones, stability, and heat resistance of resins. In terms of production efficiency, it is preferable to use single-screw extruders and multi-screw extruders.

Foaming Process

The foaming process represents a process through which a foaming agent is allowed to expand to allow a plastic composition to be foamed. When a compressible fluid is used, releasing the pressure allows the compressible fluid to expand, and allows a foaming agent to be removed. As for a temperature when the foaming process is performed, it is preferable to heat a plastic to such a temperature that the plastic is plasticized within a range allowing the plasticized plastic to be extruded.

Note that, to exert a driving force to allow the plastic composition to flow in the foaming process, the pressure from the kneader described above may be used. A separate machine such as a single-screw or multi-screw extruder or a cylinder may be used for the foaming process.

Other Processes

Other processes are not particularly limited, as long as the other processes are those that are normally performed in the manufacturing foamed plastic sheets. It is possible to appropriately select such other processes in accordance with a purpose. Examples of such other processes include a molding process for processing a material into a sheet.

Examples of the molding process include vacuum molding, pneumatic molding, and press molding. In the present embodiment, a masterbatch having a cylindrical shape is formed. This masterbatch is molded into a sheet through a molding process to obtain a foamed plastic sheet.

FIG. 1 is a schematic configuration diagram of a plastic manufacturing device for manufacturing a foamed plastic according to the present embodiment.

A plastic manufacturing device 20 includes a first extruder 21A serving as a kneader configured to perform the kneading process and a second extruder 21B configured to perform the foaming process. The extruders are coupled in series to each other.

A die 1 serving as a die for extrusion molding is attached to an end (a downstream end in an extrusion direction) of the second extruder 21B. A plastic composition is extruded from the die 1. At this time, the plastic composition is allowed to be foamed. A foamed plastic is thus molded.

The first extruder 21A has a raw material mixing and melting area (a), a compressible fluid supplying area (b), and a kneading area (c). The second extruder 21B has an extrusion area (d).

The first extruder 21A and the second extruder 21B are twin-screw extruders (manufactured by The Japan Steel Works, LTD. (JSW), screw diameter: 42 mm, and L/D=48).

Raw Material Mixing and Melting Area

In the raw material mixing and melting area a, a first constant volume feeder 22A supplies a filler, and a second constant volume feeder 22B supplies a resin material such as polylactic acid. Note that, instead of the filler, the first constant volume feeder 22A may supply a masterbatch that a kneader 10 (see FIG. 2) manufactures.

Compressible Fluid Supplying Area

A gas introduction part 23 is coupled to the compressible fluid supplying area b. The gas introduction part 23 includes a gas tank 231 in which the compressible fluid containing the foaming agent is stored, and a metering pump 232 configured to supply, at a specified amount, the compressible fluid in the gas tank 231 to the compressible fluid supplying area b.

The metering pump 132 supplies the compressible fluid containing the foaming agent to a raw material mixture in a state in which resin pellets are heated and melted to wet the filler in the raw material mixing and melting area a, thereby plasticizing the molten resin.

Kneading Area

The plastic composition supplied with the compressible fluid in the compressible fluid supplying area b is extruded to the kneading area c.

In the kneading area c, a temperature is set, at which the filler is allowed to have such viscosity that is suitable for kneading.

The set temperature varies depending on the specifications of the device, the type of a resin, the composition of the resin, and a molecular weight, for example. Therefore, although this does not intend to limit the present invention in particular ways, when such polylactic acid is used that is commercially available at a weight average molecular weight (Mw) of approximately 200,000, kneading is normally performed at a set temperature that is 10° C. to 20° C. higher than the melting point of the polylactic acid. On the other hand, performing kneading with the compressible fluid makes it possible to perform kneading at a temperature lower than the melting point of the polylactic acid. Setting the set temperature lower than the melting point of a resin makes it possible to perform kneading even when the viscosity is relatively higher. Specifically, the set temperature is caused to lower by 20° C. to 80° C., more preferably, 30° C. to 60° C., than the melting point of a resin. It is possible to simply set a temperature by using, as a guide, for example, a value of a current applied to the device for exerting stirring power.

Kneading the plastic composition at a temperature lower than the melting point makes it possible to increase the kneading efficiency, making it possible to make uniform the foaming speed in the plastic composition inside the die 1. Therefore, it is possible to suppress the occurrence of partial corrugated wrinkles on the molded foamed plastic. Furthermore, it is possible to obtain additional effects of suppressing the occurrence of the degradation, carbonization, oxidation, and decomposition of cinders and tar inside an extruder 11.

Kneading the plastic composition at a temperature lower than the melting point makes it possible to increase the kneading efficiency, making it possible to make uniform the foaming speed in the plastic composition inside the die 1. Therefore, it is possible to suppress the occurrence of partial corrugated wrinkles on the molded foamed plastic. Furthermore, it is possible to obtain additional effects of suppressing the occurrence of the degradation, carbonization, oxidation, and decomposition of cinders and tar inside an extruder 11.

Extrusion Area

The plastic composition is kneaded in the kneading area c in the first extruder 21A. The kneaded plastic composition is then supplied to the extrusion area d in the second extruder 21B. The die 1 serving as a die for extrusion molding is attached to the end (the downstream end in the extrusion direction) of the extrusion area d. When the plastic composition is extruded from the die 1, the plastic composition is allowed to be foamed, molding a foamed plastic having a cylindrical shape.

It is preferable to set the set temperature in the extrusion area d where the foaming process is performed for allowing a plastic composition to be foamed to allow the temperature of the plastic composition, when the plastic composition is extruded from the die 1, to be set lower than the melting point of the plastic composition. Setting the temperature of the plastic composition, when the plastic composition is extruded from the die 1, to a temperature lower than the melting point of the plastic composition makes it possible to make the plastic composition more viscous, making it possible to obtain a foamed plastic at a high expansion ratio.

Mold-Processing Area

In a mold-processing area e, a mandrel 25 configured to cool a foamed plastic having a cylindrical shape, which is extruded from the die 1, is disposed. The foamed plastic having the cylindrical shape, which is extruded from the die 1, is allowed to lie along the mandrel 25. The outer surface of the extruded, foamed plastic is cooled when air is blown from an air ring. The foamed plastic having the cylindrical shape is thus molded. After that, the foamed plastic having the cylindrical shape, which has been cooled, is cut and opened with a cutter to form a flat sheet. The flat sheet is then allowed to pass through a roller 26 and wound by a take-up roller 27. A foamed sheet is thus obtained.

Next, how a masterbatch that the first constant volume feeder 22A supplies to the first extruder 21A is manufactured will now be described herein.

Figure 2:
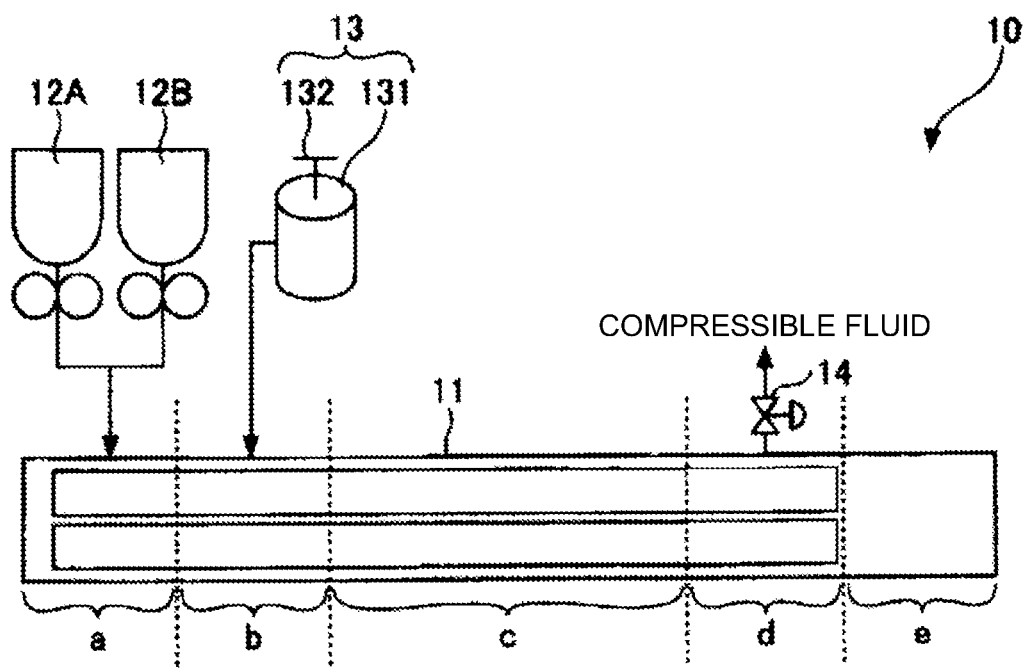
FIG. 2 is a schematic configuration diagram of a kneader 10 configured to manufacture a masterbatch.

FIG. 2 is a schematic configuration diagram of the kneader 10 configured to manufacture a masterbatch.

The kneader 10 is a twin-screw extruder (manufactured by JSW, screw diameter: 42 mm, L/D=48). Similar to the plastic manufacturing device 20 illustrated in FIG. 1, the kneader 10 has a raw material mixing and melting area (a), a compressible fluid supplying area (b), a kneading area (c), an extrusion area (d), and a mold-processing area (e).

In the raw material mixing and melting area a, a first constant volume feeder 12A supplies a filler, and a second constant volume feeder 12B supplies a resin material such as polylactic acid. In the compressible fluid supplying area b, a gas introduction part 13 then supplies a compressible fluid at a specified amount. The material is then kneaded in the kneading area c, and then extruded to the extrusion area d.

In the extrusion area d, a pressure valve 14 is provided. The pressure valve 14 is opened. The compressible fluid for the plastic composition is discharged outside. After that, the plastic composition is extruded in the form of strands. The plastic composition that has been extruded in the form of strands is cooled. The plastic composition is then pelletized with a cutter in the mold-processing area e to manufacture a masterbatch in the form of pellets.

As for the expansion ratio of a foamed plastic, the higher the expansion ratio, the superior the cost effectiveness. From a viewpoint of cost, the expansion ratio of the foamed plastic is preferably 5 times or higher, more preferably 10 times or higher, further preferably 20 times or higher, even more preferably 30 times or higher, and particularly preferably 40 times or higher. Note that, when an expansion ratio of 45 times or higher is applied, such a foamed plastic may be lowered in value as a general foamed plastic, from a viewpoint of reduced strength. The applications of such a foamed plastic may be limited to packaging materials, for example.

However, when a higher expansion ratio is applied, broken foaming may easily occur, leading to a risk of the occurrence of corrugated wrinkles on a foamed plastic. In the applications of packaging materials, some corrugated wrinkles may be acceptable from an aesthetic viewpoint. However, it is preferable that there be no corrugated wrinkles to avoid less ease of stacking.

Furthermore, in applications where molded foamed plastic sheets are used for secondary molding such as disposable containers and blister packs, the expansion ratio may range, preferably, from 1 times to 30 times, more preferably, 1 times to 10 times, and, further preferably, 1 times to 3 times. In such applications, even though its expansion ratio is low, corrugated wrinkles may occur, sacrificing its aesthetic properties. There may also be a risk of the occurrence of abnormalities in secondary molding due to reductions in strength, which are derived from the corrugated wrinkles. Therefore, such applications do not accept corrugated wrinkles.

It is possible to achieve a desired expansion ratio by controlling one of or a combination of a plurality of: kneading temperature, residence time, ambient temperature, concentration of foaming agent, type of foaming agent, uniformity of foaming agent, distribution of plastic molecular weight, and discharge speed from the die 1, for example.

It is known that corrugated wrinkles relate to the expansion ratio, and, when a higher expansion ratio is applied, broken foaming may easily occur on the surface, resulting in such corrugated wrinkles. However, as described above, there may be more optimum expansion ratios depending on the applications of molded foamed plastics. Therefore, there may be limitations in suppressing corrugated wrinkles by lowering the expansion ratio.

In the present embodiment, a flow channel in the die 1, through which a plastic composition flows while it is allowed to foam, is optimized to increase the expansion ratio at which corrugated wrinkles start to occur. Therefore, it is possible to suppress the occurrence of corrugated wrinkles without decreasing the expansion ratio, making it possible to mold a foamed plastic at an optimum expansion ratio for an application of the molded foamed plastic. This will now be specifically described herein with reference to the accompanying drawings.

Figure 3:
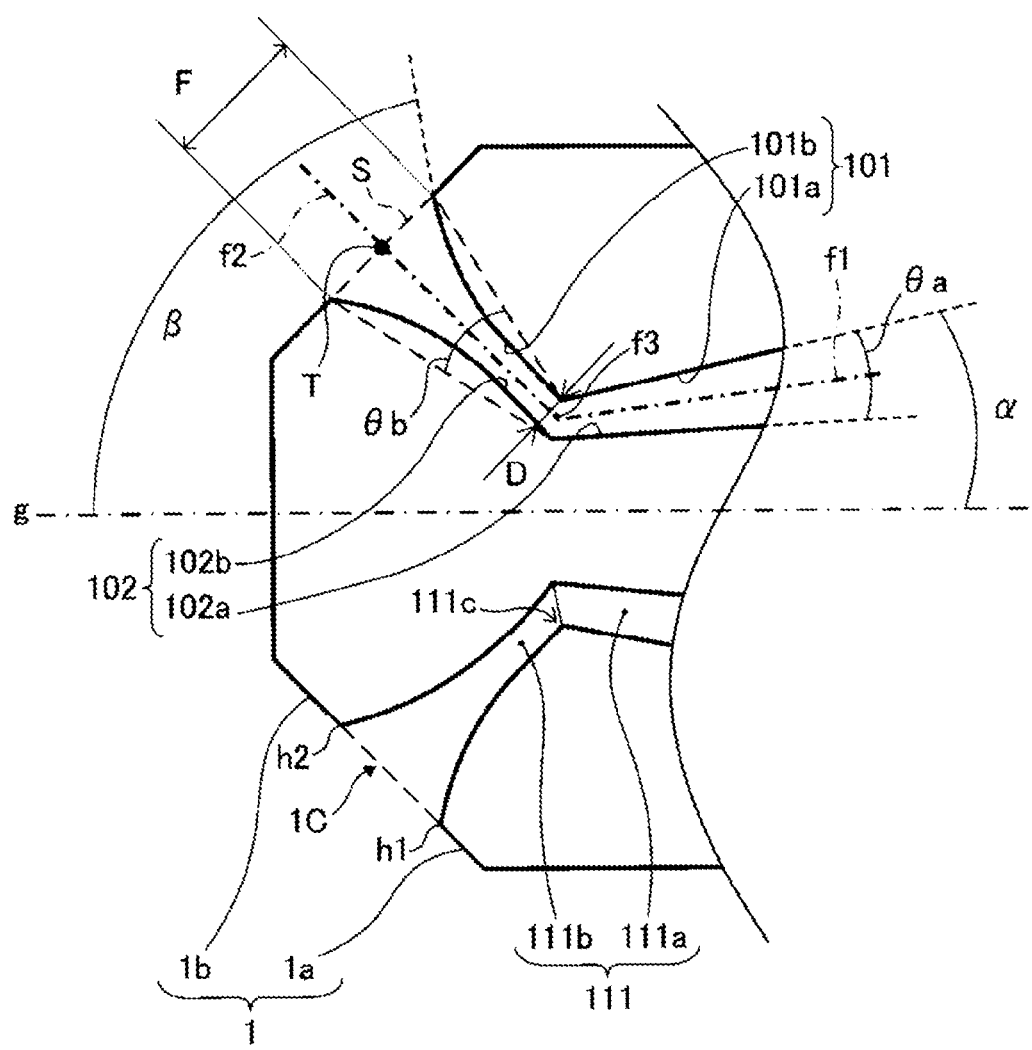
FIG. 3 is an enlarged cross-sectional view of a main part of a die.

FIG. 3 is an enlarged cross-sectional view of a main part of the die 1.

FIG. 3 is a cross-sectional view including an extrusion central axis g of the die 1.

Furthermore, the extrusion central axis g described above represents a center line of a plastic flow channel 111 having an annular shape, where a dimensional center of an inside die 1b and a dimensional center of an outside die 1a overlap with each other. Note that, when the dimensional center line of the inside die 1b and the dimensional center line of the outside die 1a do not overlap with each other, a straight line, along which the plastic fluid flows in the plastic flow channel 111 having the annular shape, which includes the center of gravity of the plastic fluid, serves as the extrusion central axis g. In the present embodiment, the die 1 is used to manufacture a molded product having a cylindrical shape. However, the same applies to such a die used to manufacture a molded product having a square cylindrical shape.

The die 1 includes the outside die 1a having a through hole 101 penetrating in the extrusion direction of a plastic composition (from the right to the left in the figure) and the inside die 1b disposed within the through hole 101 of the outside die 1a.

For the outside die 1a and the inside die 1b, it is possible to use a material selected from the group of S45C, S50C, SS400, SCM440, SUS316, and SUS304, or to use materials equivalent thereto. Furthermore, various types of plating such as hard chrome plating may be applied for the purpose of improving durability. Such a material as C2810, A5052, or alumina may also be selected for the purpose of improving thermal conductivity. Furthermore, such a material as quartz glass may also be used for analytical purposes. Mirror polishing may be applied as finishing for the purpose of improving the ease of die releasing. Furthermore, blast finishing may be applied. A release agent may also be applied. Furthermore, such a die having a variable die structure may also be used.

The through hole 101 of the outside die 1a has a perfect circle shape, and has a first inner peripheral surface 101a in which the inner diameter decreases downstream in the extrusion direction and a second inner peripheral surface 101b in which the inner diameter increases downstream in the extrusion direction. The second inner peripheral surface 101b has a protruding surface that protrudes toward the inside of the through hole, in the cross section illustrated in FIG. 3.

As for the outer diameter, the inside die 1b has a perfect circle shape at each location in the extrusion direction, and has a first outer peripheral surface 102a in which the outer diameter decreases downstream in the extrusion direction and a second outer peripheral surface 102b in which the outer diameter increases downstream in the extrusion direction. The second outer peripheral surface 102b has a protruding surface that protrudes outward, in the cross section illustrated in FIG. 3.

The inner peripheral surface of the through hole 101 of the outside die 1a serves as an outside inner wall surface of the plastic flow channel 111 through which the plastic composition flows. The outer peripheral surface of a part of the inside die 1b disposed in the through hole 101 serves as an inside inner wall surface of the plastic flow channel 111.

The plastic flow channel 111 representing a gap between the inside die 1b and the outside die 1a has a supply flow channel part 111a serving as a supply flow channel and an extrusion flow channel part 111b serving as an extrusion flow channel. In the supply flow channel part 111a, the plastic composition is supplied from the second extruder 21B. In the extrusion flow channel part 111b, an upstream end in a plastic flow direction in the flow channel is coupled to the supply flow channel part 111a, allowing the plastic composition to change its flow. A downstream end in the flow direction of the plastic composition serves as an extrusion port 1c having an annular shape, through which the plastic composition is extruded.

Note that, a coupling part 111c of the supply flow channel part 111a and the extrusion flow channel part 111b is defined as an intersection f3 at which a center line f1 of the supply flow channel part 111a, illustrated by a single-dotted chain line in the figure, and a center line f2 of the extrusion flow channel part 111b, illustrated by a single-dotted chain line in the figure, intersect with each other. Note that, when the center line f1 and the center line f2 do not intersect with each other, or when it is impossible to clearly define the supply flow channel part 111a and the extrusion flow channel part 111b, the supply flow channel part 111a, the extrusion flow channel part 111b, and the coupling part 111c are defined as described below. That is, in the plastic flow channel 111, a location lying most downstream in the plastic flow direction in the flow channel (which will be hereinafter referred to as the flow direction in the flow channel), among locations most proximal to the extrusion central axis g is defined as the coupling part 111c of the supply flow channel part 111a and the extrusion flow channel part 111b. Then, a flow channel upstream of the defined coupling part 111c in the flow direction is defined as the supply flow channel part 111a, and a flow channel upstream of the coupling part 111c in the flow direction is defined as the extrusion flow channel part 111b.

Furthermore, for a starting point of the supply flow channel part 111a (an upstream end in the flow direction in the flow channel), a location upstream of the coupling part 111c by a flow-channel length that is identical to the length of the extrusion flow channel part 111b is defined as the starting point.

Furthermore, in the cross-sectional view illustrated in FIG. 3, the extrusion port 1c is defined as a chain line S, in the figure, connecting an edge (a lip edge) h1 of a downstream opening of the through hole 101 of the outside die 1a in the extrusion direction and a maximum outer diameter part h2 of the inside die 1b is defined as the extrusion port 1c. Furthermore, an endpoint T of the extrusion flow channel part 111b (a downstream end of the flow channel in the flow direction) is defined as an intersection of the chain line S in the figure and the center line f2 of the extrusion flow channel part 111b illustrated by the single-dotted chain line in the figure.

The supply flow channel part 111a has an annular shape. The first inner peripheral surface 101a of the through hole 101 of the outside die 1a forms an outside inner wall surface of the supply flow channel part 111a. The first outer peripheral surface 102a of the outer peripheral surface 102 of the inside die 1b forms an inside inner wall surface of the supply flow channel part 111a.

The extrusion flow channel part 111b also has an annular shape. The upstream end of the extrusion flow channel part 111b in the flow direction in the flow channel is coupled to a downstream end of the supply flow channel part 111a in the flow direction in the flow channel, allowing the plastic composition to flow from the supply flow channel part 111a. The first inner peripheral surface 101a of the through hole 101 of the outside die 1a forms the outside inner wall surface of the supply flow channel part 111a. The first outer peripheral surface 102a of the outer peripheral surface 102 of the inside die 1b forms the inside inner wall surface of the supply flow channel part 111a.

In the cross section illustrated in FIG. 3, the second inner peripheral surface 101b and the second outer peripheral surface 102b both have protruding surfaces. Therefore, in the cross section illustrated in FIG. 3, both the inside and outside inner wall surfaces of the extrusion flow channel part 111b have protruding surfaces that protrude toward the inside of the flow channel part.

In the cross section illustrated in FIG. 3, with the inside inner wall surface 102b and the outside inner wall surface 101b of the extrusion flow channel part 111b both having the protruding surfaces, it is possible to suppress the inhibition of foaming of the plastic composition in the extrusion flow channel part 111b. Therefore, it is possible to suppress foaming outside the extrusion flow channel part 111b, making it possible to suppress abnormal foaming such as broken foaming and excessive foaming more than desired. As a result, it is possible to suppress the occurrence of corrugated wrinkles in a molded foamed plastic product, making it possible to increase the expansion ratio at which corrugated wrinkles occur.

Note that, in FIG. 3, the inside inner wall surface 102b and the outside inner wall surface 101b of the extrusion flow channel part 111b both have protruding surfaces. However, either the inside inner wall surface 102b or the outside inner wall surface 101b may have a protruding surface. Even when only one inner wall surface is a protruding surface, it is possible to suppress the inhibition of foaming of the plastic composition in the extrusion flow channel part 111b, compared with a case where both inner wall surfaces do not protrude toward the inside of a flow channel part, but are flat. Therefore, it is possible to suppress the occurrence of corrugated wrinkles, compared with a case where the inner wall surfaces 101b, 102b are both flat, as described above.

In the present embodiment, the protruding surface shapes of the inside inner wall surface 102b and the outside inner wall surface 101b are formed into such protruding surface shapes that the flow channel cross-sectional area, which is perpendicular to the plastic flow direction in the extrusion flow channel part 111b (which will be hereinafter simply referred to as a flow channel cross-sectional area) monotonically increases in the flow direction described above. As described above, allowing the flow channel cross-sectional area of the extrusion flow channel part 111b to monotonically increase makes it possible to further suppress the inhibition of foaming of the plastic composition. Therefore, it is possible to further increase the expansion ratio at which corrugated wrinkles occur.

Note that such protruding surface shapes may be applied that the flow channel cross-sectional area decreases toward a substantially central part of the extrusion flow channel part 111b in the flow direction, and then the flow channel cross-sectional area monotonically increases from the substantially central part to the extrusion port 1c. Depending on a plastic composition, for example, a comprehensively better molded product may be obtained when the extrusion flow channel part 111b has a protruding surface shape that the flow channel cross-sectional area decreases to a middle location of the extrusion flow channel part 111b in the flow direction, and then the flow channel cross-sectional area monotonically increases. As described above, even when such a protruding surface shape is applied that the flow channel cross-sectional area decreases to a middle location in the flow direction, and then the flow channel cross-sectional area monotonically increases, it is possible to suppress, at the locations where the flow channel cross-sectional area monotonically increases, the inhibition of foaming of the plastic composition, making it possible to suppress the occurrence of corrugated wrinkles.

Furthermore, a rate of decrease in outer diameter of the first outer peripheral surface 102a serving as the inside inner wall surface of the supply flow channel part 111a is smaller than a rate of decrease in inner diameter of the first inner peripheral surface 101a serving as the outside inner wall surface of the supply flow channel part 111a. Therefore, the flow channel cross-sectional area of the supply flow channel part 111a (the cross-sectional area that is perpendicular to the flow direction of the plastic composition in the supply flow channel part 111a) decreases downstream in the flow direction in the flow channel. As described above, allowing the flow channel cross-sectional area of the supply flow channel part 111a to decrease downstream in the flow direction in the flow channel makes it possible to suppress a decrease in pressure in the supply flow channel part 111a, making it possible to suppress foaming of the plastic composition in the supply flow channel part 111a.

Furthermore, in the cross section illustrated in FIG. 3, the extrusion flow channel part 111b is coupled to the supply flow channel part 111a, where the flow channel bends at the coupling part 111c to change the flow direction in the flow channel at the coupling part 111c. Therefore, it is possible to allow the plastic composition to reside at the coupling part, and to suppress a decrease in pressure in the supply flow channel part 111a, making it possible to suppress foaming of the plastic composition in the supply flow channel part 111a.

Furthermore, when a flow channel cross-sectional area at the coupling part 111c of the supply flow channel part 111a and the extrusion flow channel part 111b is defined as D, and a flow channel cross-sectional area at the extrusion port 1c is defined as F, it is preferable that (F/D) be 2.2 or higher. When (F/D) is set to 2.2 or higher, the plastic composition is not inhibited from being foamed, making it possible to perform shape corrections with the extrusion flow channel part 111b. Therefore, the occurrence of broken foaming is suppressed, making it possible to increase the expansion ratio at which corrugated wrinkles occur.

Note that, in the cross-sectional view illustrated in FIG. 3, the flow channel cross-sectional area D represents an area of a plane that is perpendicular to the center line f2 at the intersection f3 of the center line f2 of the extrusion flow channel part 111b and the center line f1 of the supply flow channel part 111a. For example, when there may be a plurality of locations where it is able to cut the coupling part 111c into sections due to that it has a curved shape, for example, a cross-sectional area at a location where the coupling part 111c lies most proximal to the extrusion flow channel part 111b is defined as the flow channel cross-sectional area D.

Furthermore, when the extrusion flow channel part 111b has an annular shape, and the extrusion flow channel part 111b represents, in the cross section illustrated in FIG. 3, such a flow channel that is further from the extrusion central axis g as going downstream in the flow direction of the plastic composition, the flow channel cross-sectional area D of the coupling part 111c and the flow channel cross-sectional area F of the extrusion port 1c both have such shapes that the surface of a cone is partially cut, rendering a three-dimensional plane. At this time, it is possible to obtain the flow channel cross-sectional areas D and F through analytical calculations. When such a hollow die is used that does not have a perfect circle shape, and there may be difficulties in performing analytical calculations, such cross-sectional areas may be obtained through actual measurements with a method using a three-dimensional computer aided design (CAD).

Furthermore, in the present embodiment, in the cross section illustrated in FIG. 3, the second inner peripheral surface 101b serving as the outside inner wall surface of the extrusion flow channel part 111b and the second outer peripheral surface 102b serving as the inside inner wall surface of the extrusion flow channel part 111b are both wholly formed into protruding surfaces that protrude toward the inside of the flow channel. Therefore, in the cross section illustrated in FIG. 3, there is no inflection point on the outside inner wall surface and the inside inner wall surface of the extrusion flow channel part 111b.

Therefore, it is possible to properly suppress the inhibition of foaming of the plastic composition in the extrusion flow channel part 111b, making it possible to increase the expansion ratio at which corrugated wrinkles occur.

Furthermore, it is also preferable that θb illustrated in FIG. 3 be 0.8 times or greater to 1.2 times or smaller than ea. In the cross section illustrated in FIG. 3, θb described above represents an angle formed by an approximate line, which is illustrated as a dashed line in the figure, of the second outer peripheral surface 102b serving as the inside inner wall surface of the extrusion flow channel part 111b and an approximate line, which is illustrated as a dashed line in the figure, of the second inner peripheral surface 101b serving as the outside inner wall surface. The approximate lines are defined with a least squares method. That is, a line along which a sum of squares of respective distances from the inner walls becomes minimum is defined as an approximate straight line. In the cross section illustrated in FIG. 3, ea represents an angle formed by the first outer peripheral surface 102a serving as the inside inner wall surface of the supply flow channel part 111a and the first inner peripheral surface 101a serving as the outside inner wall surface. In the present embodiment, the first outer peripheral surface 102a and the first inner peripheral surface 101a render straight lines in the cross section illustrated in FIG. 3. However, when the surfaces render curved lines in the cross section illustrated in FIG. 3, ea represents, similar to those described above, an angle formed by approximate lines defined with the least squares method.

When θb is 0.8 times or smaller than ea, there is a risk of the inhibition of foaming of the plastic composition in the extrusion flow channel part 111b. There is otherwise a risk that foaming starts upstream in the extrusion direction in the supply flow channel part 111a, leading to the occurrence of corrugated wrinkles. On the other hand, when θb is 1.2 times or greater than ea, there is a risk of abnormal foaming of the plastic composition in the supply flow channel part 111a, leading to the occurrence of corrugated wrinkles. Setting θb 0.8 times or greater to 1.2 times or smaller than ea makes it possible to properly control the foaming of the plastic composition in the plastic flow channel 111, making it possible to suppress the occurrence of corrugated wrinkles.

Furthermore, in the cross section illustrated in FIG. 3, it is preferable that an angle γ formed by the center line f1 of the supply flow channel part 111a and the center line f2 of the extrusion flow channel part 111b at the coupling part 111c satisfy $40° \leq \gamma \leq 130°$. When the angle $\gamma$ is greater than 130°, the plastic composition flows smoothly from the supply flow channel part 111a to the extrusion flow channel part 111b, decreasing the pressure applied to the plastic composition in the supply flow channel part 111a. As a result, foaming of the plastic composition starts in the supply flow channel part 111a, leading to such a risk that corrugated wrinkles easily occur.

Furthermore, when the angle $\gamma$ is smaller than 40°, a change in direction when the plastic composition flows from the supply flow channel part 111a to the extrusion flow channel part 111b becomes too large. As a result, a residence time of the plastic composition increases, leading to such a risk that corrugated wrinkles easily occur.

Allowing the angle $\alpha$ formed by the center line f1 of the supply flow channel part 111a and the center line f2 of the extrusion flow channel part 111b at the coupling part 111c to satisfy 40° a 130° makes it possible to effectively suppress starting of abnormal foaming in the plastic flow channel 111, making it possible to suppress the occurrence of corrugated wrinkles.

Furthermore, in the cross section illustrated in FIG. 3, it is preferable that an angle $\alpha$ formed by the extrusion central axis g and the supply flow channel part 111a satisfy $40° > \alpha > -10°$, more preferably, $30° > \alpha > -5°$, and further preferably $20° > \alpha > -1°$. Note that, as for the angle $\alpha$, under such an inclination that the supply flow channel part 111a lies closer to the extrusion central axis g on the downstream side than on the upstream side in the extrusion direction, an angle formed by the supply flow channel part 111a and the extrusion central axis g is referred to as a positive angle. On the other hand, under such an inclination that the supply flow channel part 111a lies closer to the extrusion central axis g on the upstream side than on the downstream side in the extrusion direction, an angle formed by the supply flow channel part 111a and the extrusion central axis g is referred to as a negative angle.

Furthermore, a largest angle, among those angles formed by the outside inner wall surface of the supply flow channel part 111a (the first inner peripheral surface 101a of the through hole 101) and the extrusion central axis g, is defined as the angle $\alpha$ formed by the extrusion central axis g and the supply flow channel part 111a.

When the angle $\alpha$ is 40° or greater, there is such a risk that a change in direction when the plastic composition flows from the supply flow channel part 111a to the extrusion flow channel part 111b becomes too large. As a result, a residence time of the plastic composition increases, leading to such a risk that corrugated wrinkles easily occur. On the other hand, when the angle $\alpha$ is −10° or smaller, there is such a risk that the plastic composition easily flows from the supply flow channel part 111a to the extrusion flow channel part 111b. As a result, there is such a risk that the pressure applied to the plastic composition in the supply flow channel part 111a decreases, leading to such a risk that the plastic composition starts to be foamed in the supply flow channel part 111a, and leading to such a risk that corrugated wrinkles easily occur.

Allowing the angle $\alpha$ formed by the extrusion central axis g and the supply flow channel part 111a to satisfy $40° > \alpha > -10°$ makes it possible to effectively suppress starting of abnormal foaming in the plastic flow channel 111, making it possible to suppress the occurrence of corrugated wrinkles.

Furthermore, in the cross section illustrated in FIG. 2, it is preferable that the angle $\beta$ formed by the extrusion central axis g and the extrusion flow channel part 111b satisfy $50° < \beta < 120°$. Note that a largest angle, among those angles formed by the outside inner wall surface of the extrusion flow channel part 111b (the second inner peripheral surface 101b of the through hole 101) and the extrusion central axis g, is defined as the angle $\beta$ formed by the extrusion central axis g and the extrusion flow channel part 111b.

When the angle $\beta$ is 120° or greater, there is such a risk that a change in the flow direction of the plastic composition from the supply flow channel part 111a to the extrusion flow channel part is too large. In this case, a residence time of the plastic composition may increase, leading to such a risk that corrugated wrinkles easily occur. On the other hand, when the angle $\beta$ is 50° or smaller, foaming in the extrusion flow channel part is inhibited, leading to such a risk that corrugated wrinkles easily occur.

Allowing the angle $\beta$ formed by the extrusion central axis g and the extrusion flow channel part 111b to satisfy $50° < \beta < 120°$ makes it possible to effectively suppress abnormal foaming in the plastic flow channel 111, making it possible to suppress the occurrence of corrugated wrinkles.

Next, the evaluation tests that the applicant has performed will now be described herein.

How to produce foamed plastic sheets used for the evaluations will now first be described herein.

Producing Foamed Plastic Sheets

To produce foamed plastic sheets, the plastic manufacturing device 20 illustrated in FIG. 1 was used. As for the first extruder 21A and the second extruder 21B of the plastic manufacturing device 20, twin-screw extruders (manufactured by JSW, screw diameter: 42 mm, and L/D=48) were used. The dies according to Examples 1 to 3 and Comparative Example 1, described later, were attached to the downstream end of the second extruder 21B in the extrusion direction to manufacture sheet-like foamed plastics. It was evaluated whether corrugated wrinkles were present. The dies according to Examples 1 to 3 and Comparative Example 1 each had an outer diameter of 70 mm, and were made of SCM440. Chrome plating had been applied on the dies.

The kneader 10 illustrated in FIG. 2 was used to produce a filler masterbatch containing a filler at 3 mass % of 3. This masterbatch was set into the first constant volume feeder 22A of the plastic manufacturing device 20 illustrated in FIG. 1. The masterbatch was supplied from the first constant volume feeder 22A to the raw material mixing and melting area a in the first extruder 21A at a speed of 1.67 kg/hr per unit time. Furthermore, a polylactic acid resin (Revode 110, manufactured by Zhejiang Hisun Biomaterials Co., Ltd. (HISUN), melting point: 160° C.) was supplied from the second constant volume feeder 22B to the raw material mixing and melting area a at a speed of 8.33 kg/hr per unit time. Therefore, a plastic composition containing the polylactic acid at a mass % of 90 or more was obtained.

In the compressible fluid supplying area b, carbon dioxide was supplied as a compressible fluid. The amount of the compressible fluid to be supplied was changed to adjust the expansion ratio.

The plastic composition supplied with the compressible fluid was kneaded in the kneading area c in the first extruder 21A, and was then supplied to the extrusion area d in the second extruder 21B. In the extrusion flow channel part 111b of the die 1, the compressible fluid was removed from the plastic composition kneaded in the extrusion area d, so that extruded foamed body was obtained. The discharge rate of the plastic composition from the die 1 was set to 10 kg/h. The temperature of the plastic composition to be extruded from the die 1 was set to 150° C.

Note that the temperature in the raw material mixing and melting area a and the compressible fluid supplying area b in the first extruder 21A was set to 190° C. Furthermore, the temperature in the kneading area c in the first extruder 21A was set to 150° C., which was 10° C. lower than the melting point temperature of the polylactic acid (160° C.). Furthermore, the temperature in the extrusion area d in the second extruder 21B was set to such a temperature that the temperature of the plastic composition to be extruded from the die 1 was approximately 150° C. or lower. Furthermore, the pressure in the area from the compressible fluid supplying area b, via the kneading area c, to the extrusion area d in the second extruder 21B (more precisely, to the supply flow channel part 111a of the die 1) was set to 7.0 MPa or higher.

Method for Evaluating Foamed Bodies

Expansion Ratio

By dividing, in accordance with the equation (*) described below, the density of the composition constituting a foamed plastic (true density: $\rho 0$) by the bulk density ($\rho 1$), it is possible to obtain the expansion ratio of the foamed plastic.

$$\text{Expansion ratio} = \text{True density } (\rho 0)/\text{Bulk density } (\rho 1) \quad (*)$$

Note that the true density used here represents the density of the plastic composition that remains as the final plastic composition. Such a true density may be a literature value or may be obtained by actually measuring non-foamed compound pellets. The true density of polylactic acid is approximately 1.25 g/cm$^3$.

The bulk density is obtained through measurements. As for the method of measuring the bulk density, it is possible to use, but not limited to, a desired, appropriate method for measuring the bulk density. For example, it is possible to measure the bulk density with the method described below. The external dimension of a foamed sheet that is left for at least 24 hours under an environment at a temperature of 23° C. and a relative humidity of 50% is measured to obtain a bulk volume. Next, the weight of this foamed sheet is measured. By dividing the weight of the foamed sheet by the bulk volume, the bulk density of the foamed sheet is obtained.

Evaluating Corrugated Wrinkles

To evaluate corrugated wrinkles, whether or not there was the occurrence of corrugated wrinkles was checked through visual observations of surfaces and cross sections of foamed bodies. Note that a range of expansion ratio at which corrugated wrinkles occurred when the expansion ratio was changed with such a desired method as described above was used as an evaluation item.

Example 1

In the die according to Example 1, in the cross section illustrated in FIG. 3, the inside inner wall surface 102b of the extrusion flow channel part 111b was formed into a protruding surface that protrudes toward the inside of the flow channel part, and the outside inner wall surface 101b was formed into a flat surface that was not curved in the flow direction in the flow channel. Furthermore, in Example 1, such a configuration was applied that the flow channel cross-sectional area of the extrusion flow channel part 111b decreased to a middle location in the flow direction of the plastic composition, and then monotonically increased. Other configurations than this configuration were identical to the configurations of the die illustrated in FIG. 3.

The die according to Example 1 was attached to the end of the second extruder 21B. The amount of a compressible fluid to be supplied was intentionally changed to obtain foamed bodies at expansion ratios ranging from 1 times to 50 times.

As a result, in the foamed bodies where the expansion ratios ranged from 1 times to 30 times, no corrugated wrinkles were observed. The obtained foamed bodies were determined as acceptable. In the foamed bodies where the expansion ratios ranged from 30 times to 50 times, some corrugated wrinkles were observed. However, there were neither torn locations nor transparent or translucent locations on the corrugated portions.

Example 2

In the die according to Example 2, in the cross section illustrated in FIG. 3, the outside inner wall surface 101b of the extrusion flow channel part 111b was formed into a protruding surface that protrudes toward the inside of the flow channel, and the inside inner wall surface 102b was formed into a flat surface that was not curved in the flow direction in the flow channel. In Example 2, such a configuration was applied that the flow channel cross-sectional area of the extrusion flow channel part 111b decreased to a middle location in the flow direction of the plastic composition, and then monotonically increased. Other configurations than this configuration were identical to the configurations of the die illustrated in FIG. 3. The die according to Example 2 was attached to the end of the second extruder 21B, and foamed bodies were obtained, similar to Example 1.

As a result, similar to Example 1, in the foamed bodies where expansion ratios ranged from 1 times to 30 times, no corrugated wrinkles were observed. The obtained foamed bodies were determined as acceptable. At the expansion ratios above the expansion ratios applied here, corrugated wrinkles were observed.

Example 3

The die according to Example 3 was identical to the die illustrated in FIG. 3. That is, in the cross section illustrated in FIG. 3, the outside inner wall surface 101b and the inside inner wall surface 102b of the extrusion flow channel part 111b were formed into protruding surfaces, and the flow channel cross-sectional area of the extrusion flow channel part 111b was allowed to monotonically increase. The die according to Example 3 was attached to the end of the second extruder 21B, and foamed bodies were obtained, similar to Example 1.

As a result, in the foamed bodies where the expansion ratios ranged from 1 times to 35 times, no corrugated wrinkles were observed. The obtained foamed bodies were determined as acceptable. At the expansion ratios above the expansion ratios applied here, corrugated wrinkles were observed.

Comparative Example 1

In the die according to Comparative Example 1, the outside inner wall surface 101b and the inside inner wall surface 102b of the extrusion flow channel part 111b were formed into flat surfaces that were not curved in the flow direction in the flow channel. Other configurations than this configuration were identical to the configurations of the die illustrated in FIG. 3. The die according to Comparative Example 1 was attached to the end of the second extruder 21B, and foamed bodies were obtained, similar to in Example 1.

As a result, in the foamed bodies where the expansion ratios ranged from 1.5 times to 50 times, corrugated wrinkles were observed. On the foamed bodies, there were remarkable, periodical corrugations particularly in the direction orthogonal to the extrusion direction, or what is called the TD direction. The obtained foamed bodies were unacceptable for practical purposes. Among those foamed bodies, the corrugated wrinkles when the expansion ratios were higher, that is, 5 times or higher, had led to, in addition to simple deviations in thickness, remarkable transparent or translucent locations and torn locations on the foamed bodies, due to the unacceptable corrugations.

According to the results described above, it has been found that forming at least either the outside inner wall surface 101b or the inside inner wall surface 102b of the extrusion flow channel part 111b into a protruding surface that protrudes toward the inside of the flow channel part makes it possible to significantly increase the expansion ratio at which corrugated wrinkles occur, compared with Comparative Example 1 in which the outside inner wall surface 101b and the inside inner wall surface 102b of the extrusion flow channel part 111b were formed into flat surfaces that were not curved in the flow direction in the flow channel.

Furthermore, it has been found that if at least one of the outside inner wall surface 101b or the inside inner wall surface 102b of the extrusion flow channel part 111b is formed into a protruding surface, it is possible to prevent the occurrence of corrugated wrinkles where expansion ratios ranged from at least 1 times to 30 times. Therefore, it has been possible to mold foamed plastics at a high expansion ratio at which no corrugated wrinkles occur, making it possible to manufacture foamed plastics that do not sacrifice aesthetics and strength, and are advantageous in cost.

Note that such examples have been described above, in which the extrusion port 1c and the plastic flow channel 111 have annular shapes in cross sections that are perpendicular to the extrusion central axis g, and the plastic composition is extruded in a cylindrical shape from the extrusion port 1c. However, the present invention is not limited to the examples. For example, it is possible to apply the present invention to dies in which the extrusion port 1c and the plastic flow channel 111 have rectangular or circular shapes in cross sections that are perpendicular to the extrusion central axis g, and a plastic composition is extruded in a solid shape. Even with a die that extrudes a plastic composition in a solid shape, in which the inner wall surface of the extrusion flow channel part is formed into a protruding surface that protrudes toward the inside of the extrusion flow channel part, in a cross section that is parallel to the extrusion central axis, which includes the extrusion central axis, it is possible to suppress the inhibition of foaming of the plastic composition in the extrusion flow channel part. Therefore, it is possible to suppress the occurrence of corrugated wrinkles.

Those described above are mere examples. Specific effects are achieved per those aspects described below.

Aspect 1

In a die for extrusion molding, such as the die 1, which includes: the extrusion port 1c through which a plastic composition containing at least one type of plastic of is extruded; and a plastic flow channel 111 through which the plastic composition to be supplied flows to the extrusion port 1c, the plastic flow channel 111 includes: a supply flow channel, such as the supply flow channel part 111a, to which the plastic composition is supplied; and an extrusion flow channel, such as the extrusion flow channel part 111b, having an upstream end in a flow direction of the plastic composition, the upstream end being coupled to the supply flow channel, and a downstream end in the flow direction, the downstream end having the extrusion port 1c. In the extrusion flow channel, a flow channel cross-sectional area that is perpendicular to the flow direction of the plastic composition in the extrusion flow channel gradually changes to the extrusion port 1c, and an inner wall surface of the flow channel has a protruding surface that protrudes toward the inside of the flow channel in a cross section including the extrusion central axis g and parallel to the extrusion central axis g.

Therefore, as described above in the evaluation tests, it is possible to not inhibit the foaming of the plastic composition, but to extrude the plastic composition from the extrusion port, making it possible to suppress the occurrence of corrugated wrinkles on a foamed plastic extruded and molded from the die for extrusion molding of a foamed plastic.

Aspect 2

In Aspect 1, the flow channel cross-sectional area of the extrusion flow channel, such as the extrusion flow channel part 111b, monotonically increases in the flow direction of the plastic composition in the extrusion flow channel.

According to the aspect, it is possible to suppress the inhibition of foaming of a plastic composition in the extrusion flow channel, such as the extrusion flow channel part, making it possible to suppress the occurrence of corrugated wrinkles.

Aspect 3

In Aspect 1 or 2, the protruding surface has no inflection point.

According to the aspect, as described in the embodiment, it is possible to suppress the inhibition of foaming of the plastic composition in the extrusion flow channel, such as the extrusion flow channel part 111b, making it possible to suppress the occurrence of corrugated wrinkles.

Aspect 4

In any one of Aspects 1 to 3, F/D is 2.2 or higher, where the flow channel cross-sectional area at the coupling part 111c of the extrusion flow channel, such as the extrusion flow channel part 111b, and the supply flow channel, such as the supply flow channel part 111a, is D, and the flow channel cross-sectional area at the extrusion port 1c is F.

According to the aspect, as described in the embodiment, it is possible to suppress the occurrence of corrugated wrinkles.

Aspect 5

In any one of Aspects 1 to 4, the outside die 1a having the through hole 101 and the inside die 1b disposed in the through hole are further included, where an inner peripheral surface of the through hole 101 of the outside die 1a and an outer peripheral surface of the inside die 1b form the supply flow channel, such as the supply flow channel part 111a having an annular shape, the extrusion flow channel, such as the extrusion flow channel part 111b having an annular shape, and the extrusion port 1c having an annular shape, to extrude the plastic composition in a cylindrical shape.

According to the aspect, it is possible to easily form a supply flow channel, such as the supply flow channel part 111a having an annular shape, an extrusion flow channel, such as the extrusion flow channel part 111b having an annular shape, and the extrusion port 1c having an annular shape.

Aspect 6

In Aspect 5, in the cross section including the extrusion central axis g and parallel to the extrusion central axis g, either the inner peripheral surface of the through hole 101 of the outside die 1a forming the extrusion flow channel, such as the extrusion flow channel part 111b, or the outer peripheral surface of the inside die 1b forming the extrusion flow channel has a protruding surface that protrudes toward the inside of the flow channel.

According to the aspect, as described in Examples 1 to 3, it is possible to suppress the inhibition of foaming of the plastic composition in the flow channel part, such as the extrusion flow channel part 111b, making it possible to suppress the occurrence of corrugated wrinkles.

Aspect 7

In Aspect 5 or 6, in the cross section including the extrusion central axis g and parallel to the extrusion central axis g, an angle formed by an approximation straight line of the inner peripheral surface 101b of the through hole 101 of the outside die 1a forming the extrusion flow channel, such as the extrusion flow channel part 111b and an approximation straight line of the outer peripheral surface 102b of the inside die 1b forming the extrusion flow channel falls within a range from 0.8 times or more to 1.2 times or less with respect to an angle formed by an approximation straight line of the inner peripheral surface 101a of the through hole 101 of the outside die 1a forming the supply flow channel, such as the supply flow channel part 111a, and an approximation straight line of the outer peripheral surface 102a of the inside die 1b forming the supply flow channel.

According to the aspect, as described in the embodiment, it is possible to allow the plastic composition to be foamed at appropriate locations in the die, making it possible to suppress the occurrence of broken foaming, and to suppress the occurrence of corrugated wrinkles.

Aspect 8

In any one of Aspects 5 to 7, a maximum angle α formed by the extrusion central axis g and the supply flow channel satisfies $-10°<\alpha<40°$, provided that an angle formed by the extrusion central axis g and the supply flow channel when the supply flow channel is tilted such that the supply flow channel, such as the supply flow channel part 111a, is located more inside as going downstream in the flow direction of the plastic composition is a positive angle, and an angle formed by the extrusion central axis g and the supply flow channel when the supply flow channel is tilted such that the supply flow channel is located more outside as going downstream in the flow direction of the plastic composition is a negative angle, in the cross section including the extrusion central axis g and parallel to the extrusion central axis g.

According to the aspect, as described in the embodiment, it is possible to allow the plastic composition to be foamed at appropriate locations in the die, making it possible to suppress corrugated wrinkles.

Aspect 9

In any one of Aspects 5 to 8, in the cross section including the extrusion central axis g and parallel to the extrusion central axis g, a maximum angle β formed by the extrusion central axis g and the extrusion flow channel, such as the extrusion flow channel part 111b, satisfies $50°<\beta<120°$ or smaller.

It is therefore possible to allow the plastic composition to be properly foamed in the extrusion flow channel part 111b, making it possible to suppress the occurrence of abnormal foaming.

Aspect 10

In a plastic manufacturing device 20 including a die for extrusion molding of a foamed plastic according to any one of Aspects 1 to 9, such as the die 1, the plastic composition containing the at least one type of plastic of at least one type is supplied to the die, and the plastic composition is extruded from the extrusion port 1c of the die to manufacture a foamed plastic.

According to the aspect, it is possible to increase the expansion ratio at which corrugated wrinkles occur.

Aspect 11

In Aspect 10, a kneading part, such as the kneading area c, is further included, and the kneading part is configured to knead, under the presence of a compressible fluid, the at least one type of plastic at a temperature lower than a melting point of the at least one type of plastic to obtain a plastic composition.

According to the aspect, as described in the embodiment, it is possible to increase the kneading efficiency, making it possible to make uniform the foaming speed in the plastic composition in the die. Therefore, it is possible to suppress the occurrence of partial corrugated wrinkles. Furthermore, it is possible to suppress the occurrence of degradation, carbonization, oxidation, and decomposition of cinders and tar inside the plastic manufacturing device 20.

Aspect 12

In Aspect 10 or 11, an extrusion molding part, such as the extrusion area d, is further included, and the extrusion molding part is configured to extrude, under the presence of a compressible fluid, the plastic composition from the die, such as the die 1, at a temperature lower than the melting point of the at least one type of plastic, such as polylactic acid, to form a foamed plastic.

According to the aspect, it is possible to increase the viscosity of a plastic composition, compared with a case where a plastic composition is extruded from a die, such as the die 1, at a temperature higher than the melting point of the plastic to form a foamed plastic. Therefore, it is possible to extrude a plastic composition in a state where the viscosity is high to form a foamed plastic, making it possible to obtain an acceptable foamed body with no broken foaming.

Aspect 13

In any one of Aspects 10 to 12, the plastic composition contains polylactic acid at a mass percentage of 90 or more.

According to the aspect, as described in the embodiment, it is possible to provide a device for manufacturing a foamed plastic composition having a biodegradable property.

Aspect 14

A foamed plastic manufacturing method using the die for extrusion molding of a foamed plastic according to any one of Aspects 1 to 8, includes extruding a plastic composition containing at least one type of plastic from the extrusion port 1c of a die, such as the die 1.

According to the aspect, it is possible to manufacture a foamed plastic at expansion ratios ranging from 1 times or greater and 30 times or smaller, and where no corrugated wrinkles are observed.

According to an embodiment, it is possible to suppress the occurrence of corrugated wrinkles on a foamed plastic.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. A die for extrusion molding comprising:
an extrusion port configured to extrude a plastic composition containing at least one type of plastic; and
a plastic flow channel configured to cause the plastic composition to flow to the extrusion port, wherein the plastic flow channel includes:
a supply flow channel configured to be supplied with the plastic composition; and
an extrusion flow channel having:
an upstream end in a flow direction of the plastic composition, the upstream end being coupled to the supply flow channel, and
a downstream end in the flow direction, the downstream end having the extrusion port,
wherein in the extrusion flow channel, a flow channel cross-sectional area perpendicular to the flow direction of the plastic composition in the extrusion flow channel gradually changes to the extrusion port, wherein an inner wall surface of the extrusion flow channel has a protruding surface protruding toward an inside of the extrusion flow channel in a cross section including an extrusion central axis and parallel to the extrusion central axis, and wherein the protruding surface of the inner wall surface forms a curved inner wall surface in the extrusion flow channel extending an entire length of the extrusion flow channel from the upstream end to the downstream end.

2. The die for extrusion molding according to claim 1, wherein the flow channel cross-sectional area of the extrusion flow channel monotonically increases in the flow direction of the plastic composition in the extrusion flow channel.

3. The die for extrusion molding according to claim 1, wherein the protruding surface has no inflection point.

4. The die for extrusion molding according to claim 1, wherein F/D is 2.2 or higher, where the flow channel cross-sectional area at a coupling part of the extrusion flow channel and the supply flow channel is D, and the flow channel cross-sectional area at the extrusion port is F.

5. The die for extrusion molding according to claim 1 further comprising:
an outside die having a through hole; and
an inside die disposed in the through hole,
wherein an inner peripheral surface of the through hole of the outside die and an outer peripheral surface of the inside die form the supply flow channel having an annular shape, the extrusion flow channel having an annular shape, and the extrusion port having an annular shape, to extrude the plastic composition in a cylindrical shape.

6. The die for extrusion molding according to claim 5, wherein in the cross section including the extrusion central axis and parallel to the extrusion central axis, one of the inner peripheral surface of the through hole of the outside die forming the extrusion flow channel and the outer peripheral surface of the inside die forming the extrusion flow channel has a protruding surface protruding toward the inside of the flow channel.

7. The die for extrusion molding according to claim 5, wherein in the cross section including the extrusion central axis and parallel to the extrusion central axis, an angle formed by an approximation straight line of the inner peripheral surface of the through hole of the outside die forming the extrusion flow channel and an approximation straight line of the outer peripheral surface of the inside die forming the extrusion flow channel is 0.8 times or more to 1.2 times or less with respect to an angle formed by an approximation straight line of the inner peripheral surface of the through hole of the outside die forming the supply flow channel and an approximation straight line of the outer peripheral surface of the inside die forming the supply flow channel.

8. The die for extrusion molding according to claim 5, wherein a maximum angle $\alpha$ formed by the extrusion central axis and the supply flow channel satisfies $-10°<\alpha<40°$, provided that an angle formed by the extrusion central axis and the supply flow channel when the supply flow channel is tilted such that the supply flow channel is located more inside as going downstream in the flow direction of the plastic composition is a positive angle, and an angle formed by the extrusion central axis and the supply flow channel when the supply flow channel is tilted such that the supply flow channel is located more outside as going downstream in the flow direction of the plastic composition is a negative angle, in the cross section including the extrusion central axis and parallel to the extrusion central axis.

9. The die for extrusion molding according to claim 5, wherein in the cross section including the extrusion central axis and parallel to the extrusion central axis, a maximum angle $\beta$ formed by the extrusion central axis and the extrusion flow channel satisfies $50°<\beta<120°$ or smaller.

10. A plastic manufacturing device comprising a die for extrusion molding according to claim 1, the plastic manufacturing device being configured to supply a plastic composition containing the at least one type of plastic to the die, and configured to extrude the plastic composition from an extrusion port of the die to manufacture a foamed plastic.

11. The plastic manufacturing device according to claim 10, further comprising a kneading part configured to knead, under presence of a compressible fluid, the at least one type of plastic at a temperature lower than a melting point of the at least one type of plastic to obtain a plastic composition.

12. The plastic manufacturing device according to claim 10, further comprising an extrusion molding part configured to extrude, under presence of a compressible fluid, the plastic composition from the die at a temperature lower than the melting point of the at least one type of plastic to form a foamed plastic.

13. The plastic manufacturing device according to claim 10, wherein the plastic composition contains polylactic acid at a mass percentage of 90 or more.

14. A plastic manufacturing method using the die for extrusion molding according to claim 1, comprising extruding a plastic composition containing at least one type of plastic from an extrusion port of a die to manufacture a foamed plastic.

* * * * *